(12) United States Patent
Kim

(10) Patent No.: US 10,895,670 B2
(45) Date of Patent: Jan. 19, 2021

(54) CAMERA MODULE INCLUDING LIQUID LENS AND OPTICAL DEVICE COMPRISING SAME

(71) Applicant: LG INNOTEK CO., LTD., Seoul (KR)

(72) Inventor: Ui Jun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/478,349

(22) PCT Filed: Jan. 17, 2018

(86) PCT No.: PCT/KR2018/000788
§ 371 (c)(1),
(2) Date: Jul. 16, 2019

(87) PCT Pub. No.: WO2018/135851
PCT Pub. Date: Jul. 26, 2018

(65) Prior Publication Data
US 2019/0369304 A1 Dec. 5, 2019

(30) Foreign Application Priority Data
Jan. 17, 2017 (KR) .................. 10-2017-0008042

(51) Int. Cl.
*G02B 3/14* (2006.01)
*H04N 5/225* (2006.01)

(52) U.S. Cl.
CPC .............. *G02B 3/14* (2013.01); *H04N 5/2254* (2013.01); *H04N 5/22525* (2018.08)

(58) Field of Classification Search
CPC .... G02B 3/14; G02B 26/005; H04N 5/22525; H04N 5/2254; H04N 5/2257;
(Continued)

(56) References Cited

U.S. PATENT DOCUMENTS

2006/0193058 A1 8/2006 Ootsuka et al.
2008/0267603 A1 10/2008 Jung et al.
(Continued)

FOREIGN PATENT DOCUMENTS

CN 1705123 A 12/2005
EP 1 906 213 A1 4/2008
(Continued)

OTHER PUBLICATIONS

International Search Report (PCT/ISA/210) issued in PCT/KR2018/000788, dated Apr. 26, 2018.

*Primary Examiner* — Padma Haliyur
(74) *Attorney, Agent, or Firm* — Birch, Stewart, Kolasch & Birch, LLP

(57) ABSTRACT

A camera module according to the present invention includes a holder including a solid lens; a liquid lens coupled to the holder; a first substrate connected to the liquid lens, the first substrate including a first terminal and second terminal; a second substrate connected to the first substrate; and an image sensor arranged on the second substrate, the image sensor being located at a location corresponding to the liquid lens, wherein the liquid lens includes a first plate having cavities in which a conductive liquid and a non-conductive liquid are disposed; a first electrode disposed on the first plate; a second electrode disposed under the first plate, and including a plurality of electrode sectors; a second plate arranged on the first electrode; and a third plate arranged under the second electrode.

20 Claims, 9 Drawing Sheets

(58) Field of Classification Search
CPC ........... H04N 5/23258; H04N 5/23287; H04N 5/23212; H04N 5/2253
See application file for complete search history.

(56) References Cited

U.S. PATENT DOCUMENTS

| | | | | |
|---|---|---|---|---|
| 2009/0252485 | A1* | 10/2009 | Tsuchiya | G02B 3/08 396/200 |
| 2010/0247086 | A1* | 9/2010 | Tallaron | G02B 13/004 396/133 |
| 2011/0211262 | A1* | 9/2011 | Craen | G02B 26/005 359/666 |
| 2012/0026596 | A1 | 2/2012 | Berge et al. | |
| 2013/0038944 | A1* | 2/2013 | Chang | G02B 26/004 359/666 |
| 2013/0070249 | A1* | 3/2013 | Choi | A61B 5/0066 356/445 |
| 2013/0128367 | A1 | 5/2013 | Tsai et al. | |
| 2014/0092388 | A1* | 4/2014 | Lee | G02B 26/10 356/445 |
| 2017/0010456 | A1* | 1/2017 | Gopinath | G02B 23/243 |

FOREIGN PATENT DOCUMENTS

| | | |
|---|---|---|
| EP | 2 071 367 A1 | 8/2009 |
| JP | 2006-235478 A | 9/2006 |
| JP | 2007-121821 A | 5/2007 |
| JP | 2008-276228 A | 11/2008 |
| KR | 10-2008-0064235 A | 7/2008 |
| KR | 10-0843473 B1 | 7/2008 |
| KR | 10-0856092 B1 | 9/2008 |
| WO | WO 2008/082025 A1 | 7/2008 |

\* cited by examiner

[FIG. 1]
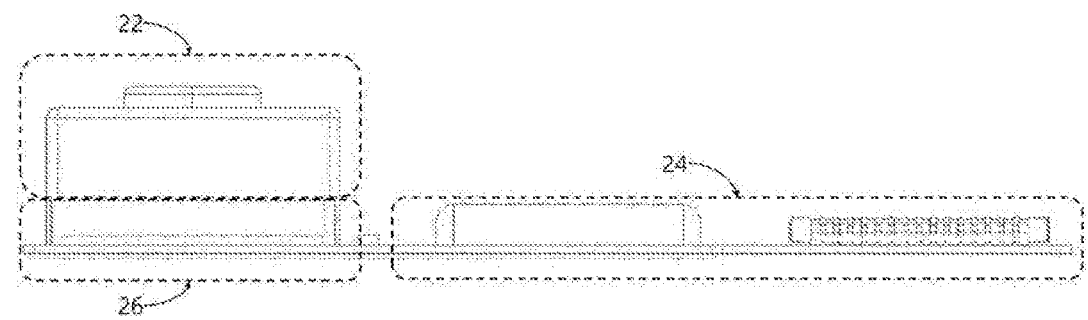
[FIG. 2]
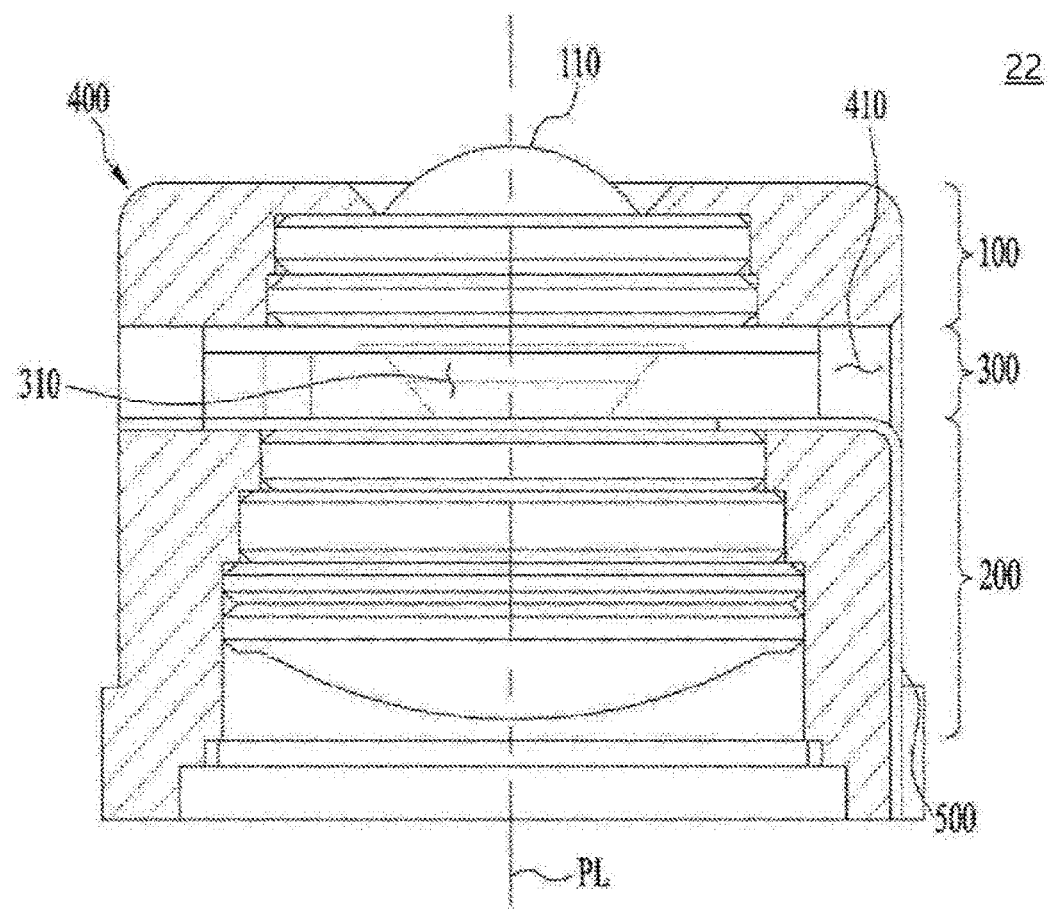

[FIG. 3a]
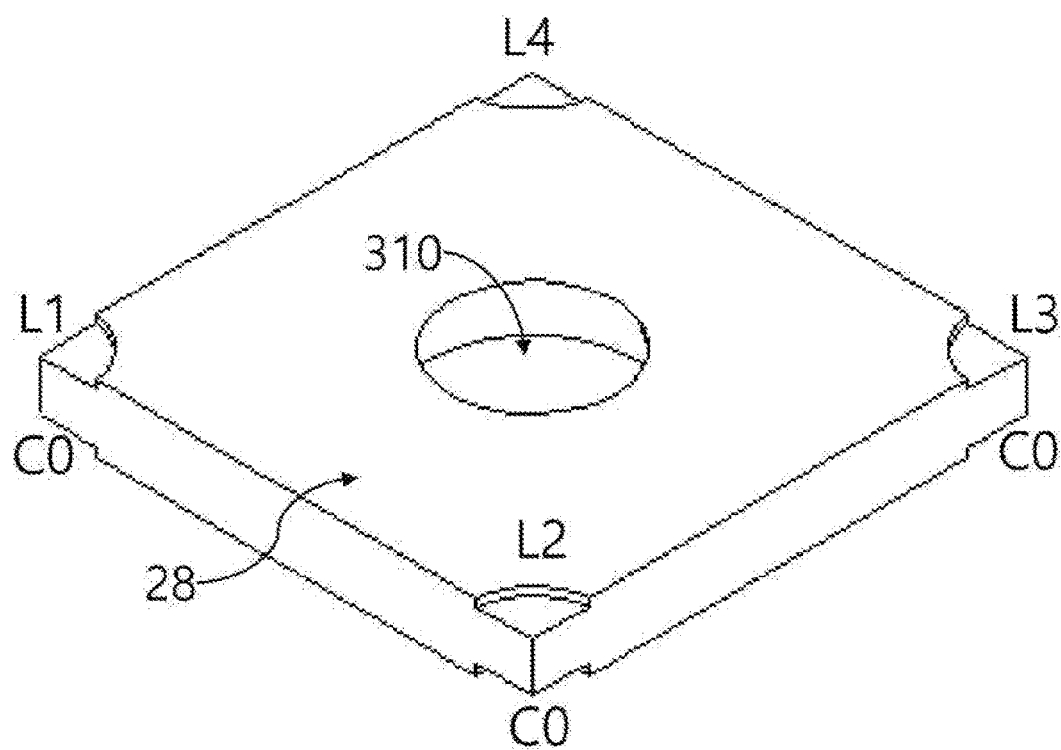

[FIG. 3b]
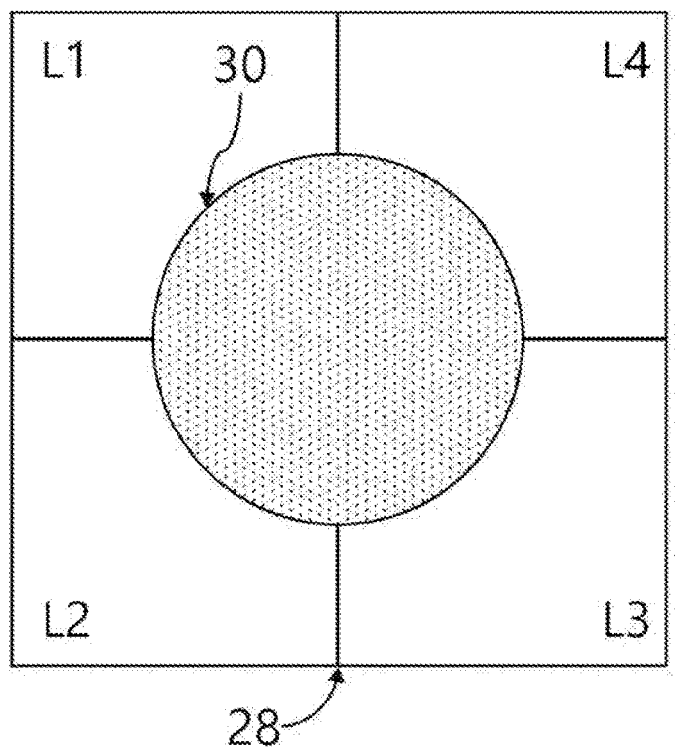
[FIG. 4]
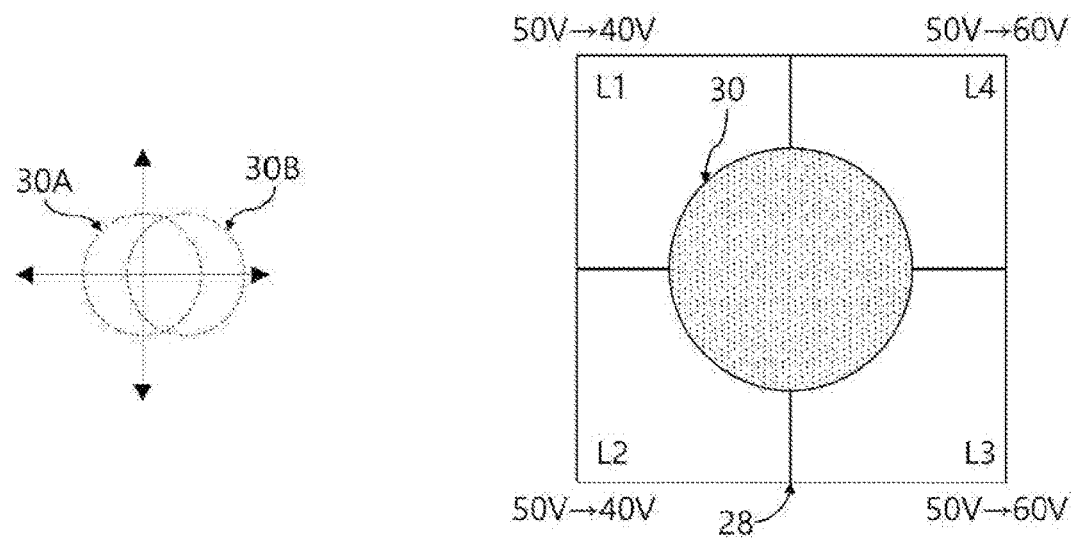

[FIG. 5]
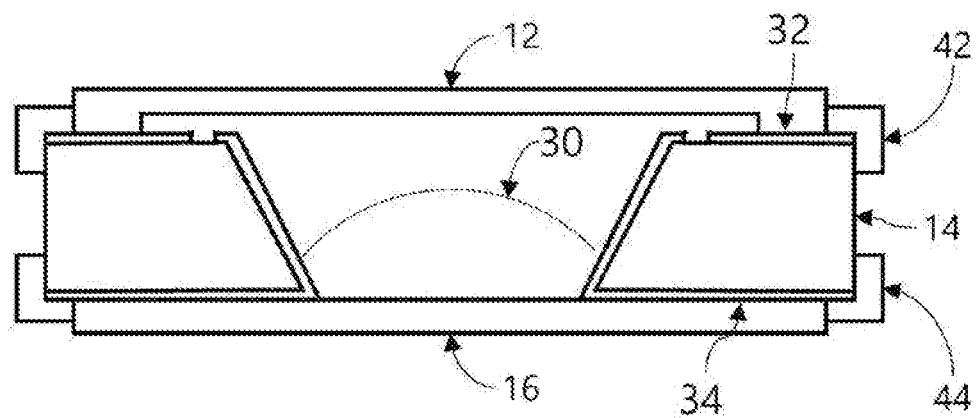
[FIG. 6]
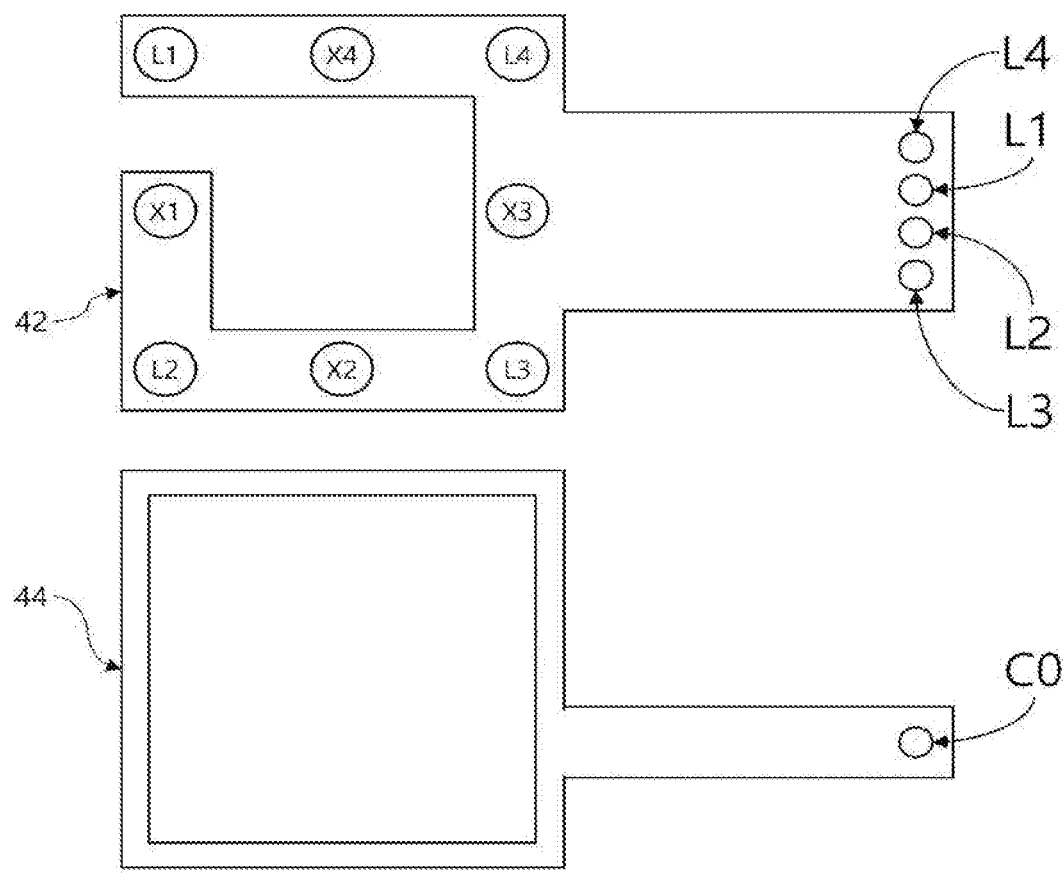

【FIG. 7】
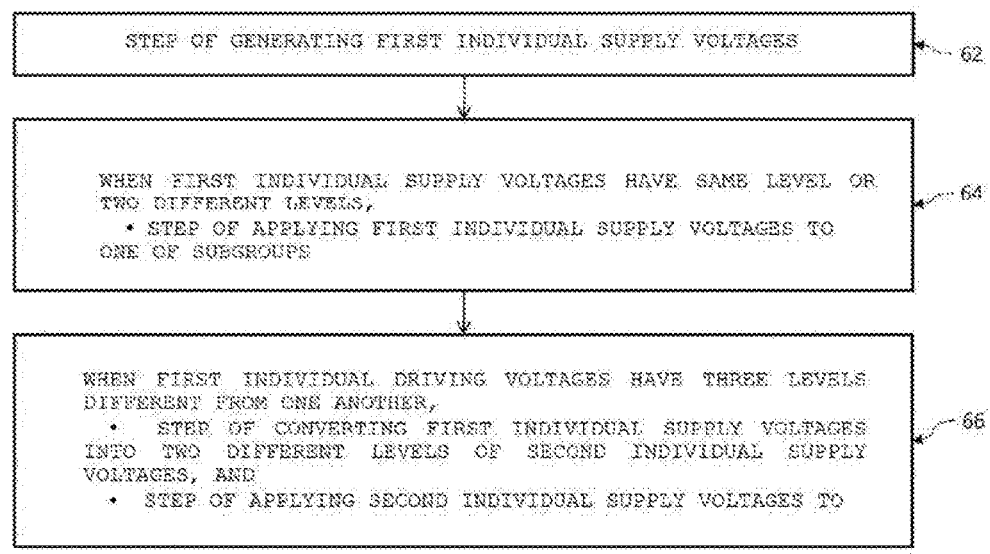
【FIG. 8】
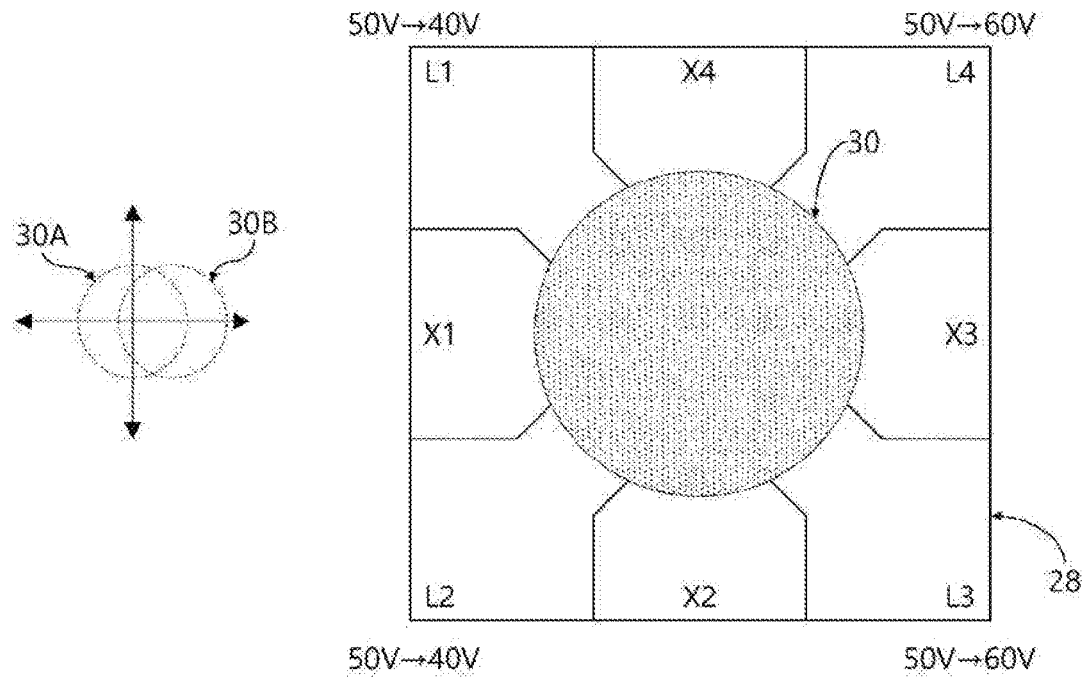

[FIG. 9]
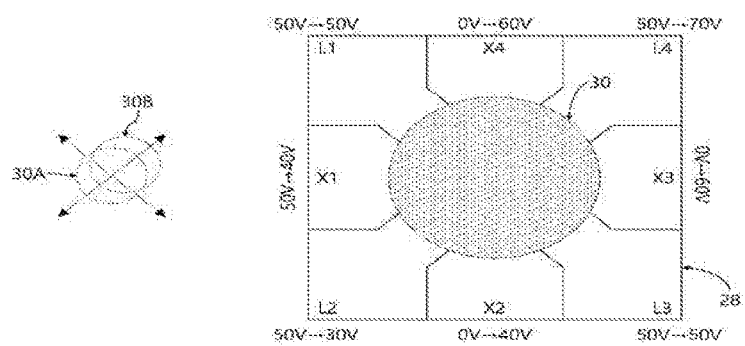
[FIG. 10]
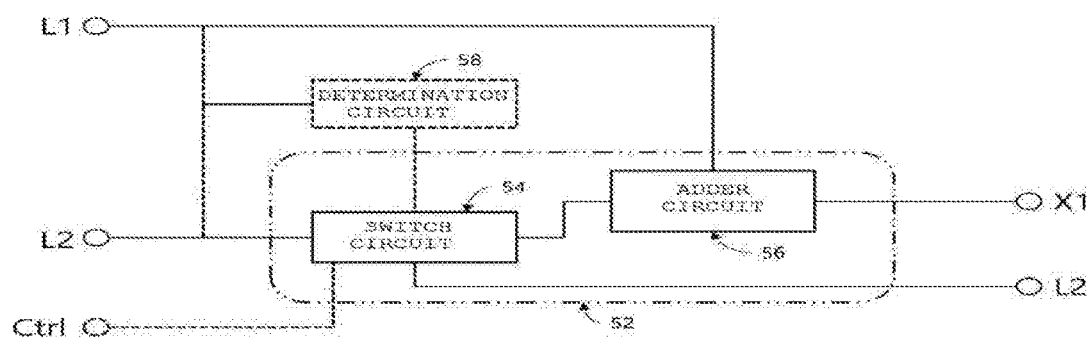
[FIG. 11]
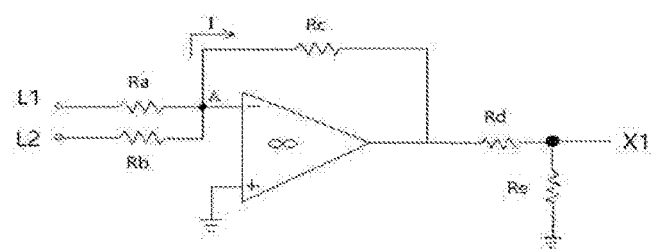

[FIG. 12]
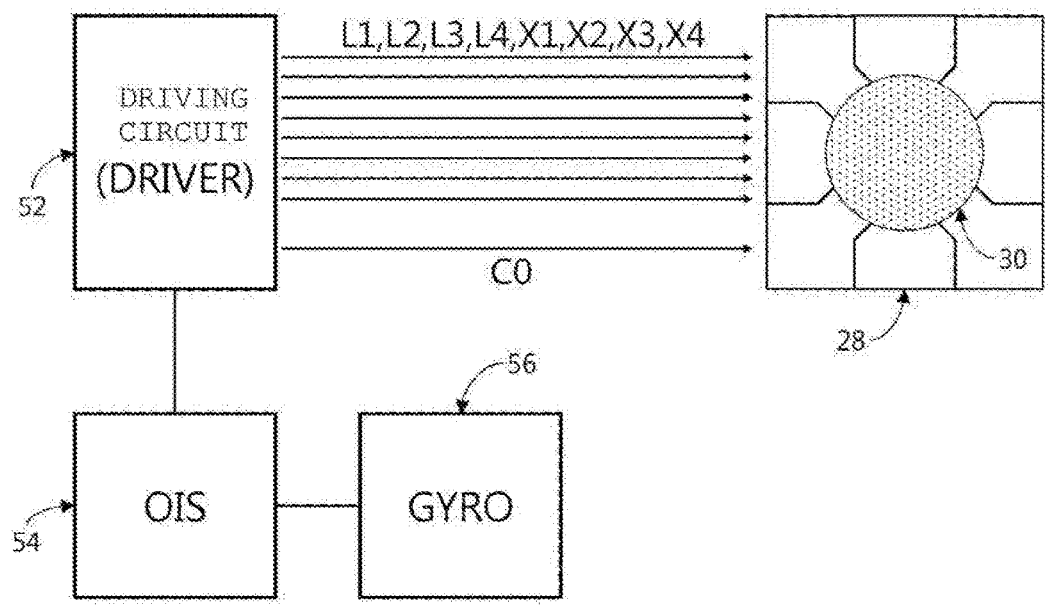
[FIG. 13]
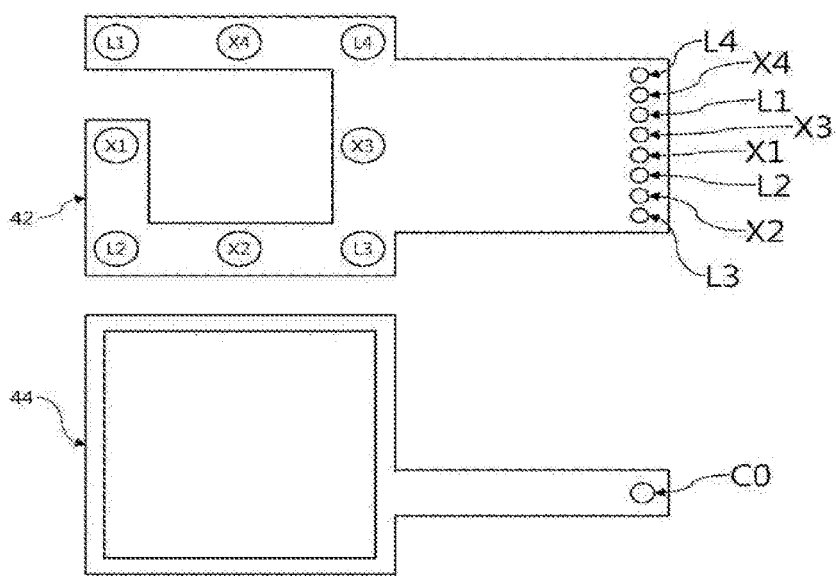

[FIG. 14]
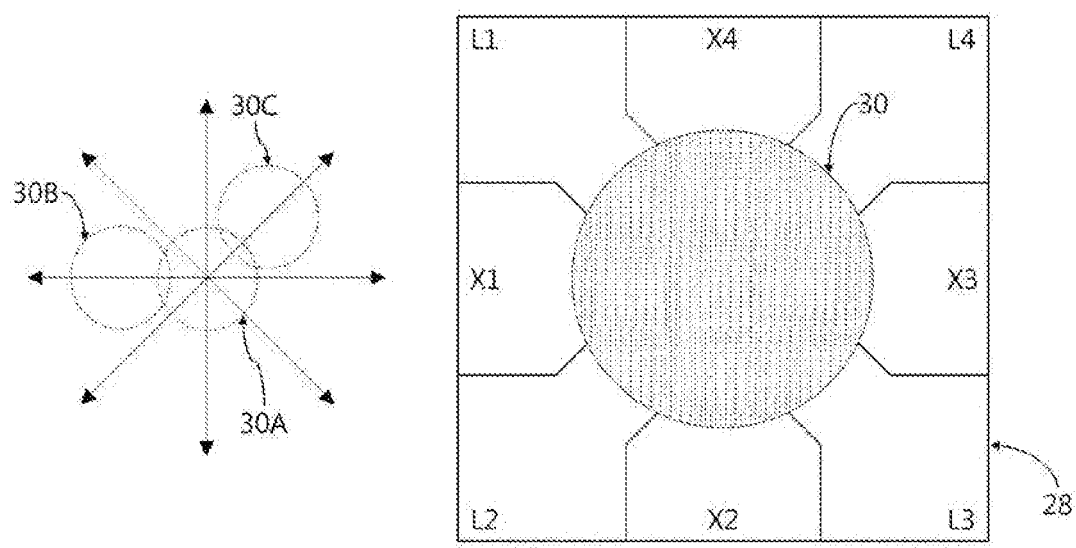
[FIG. 15a]
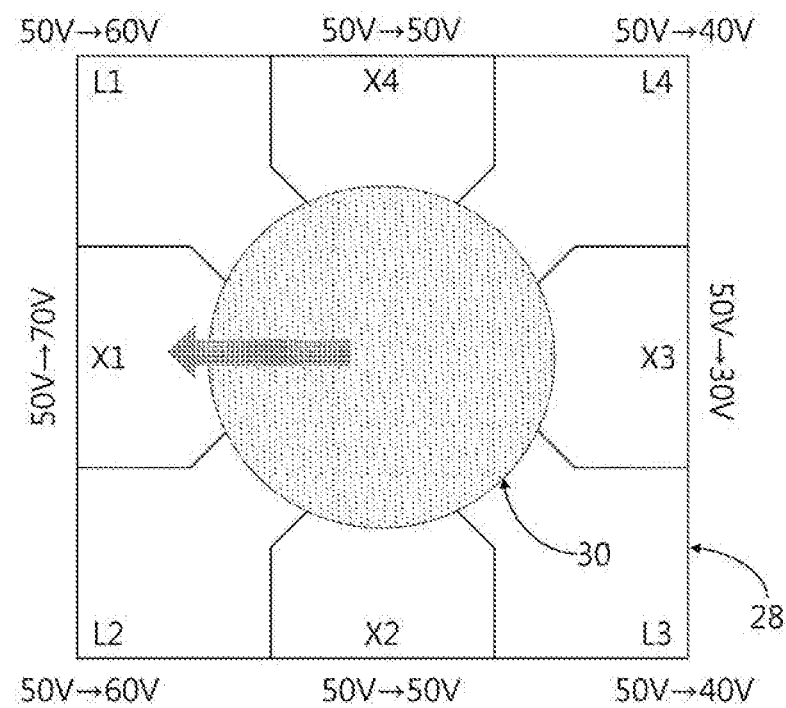

[FIG. 15b]
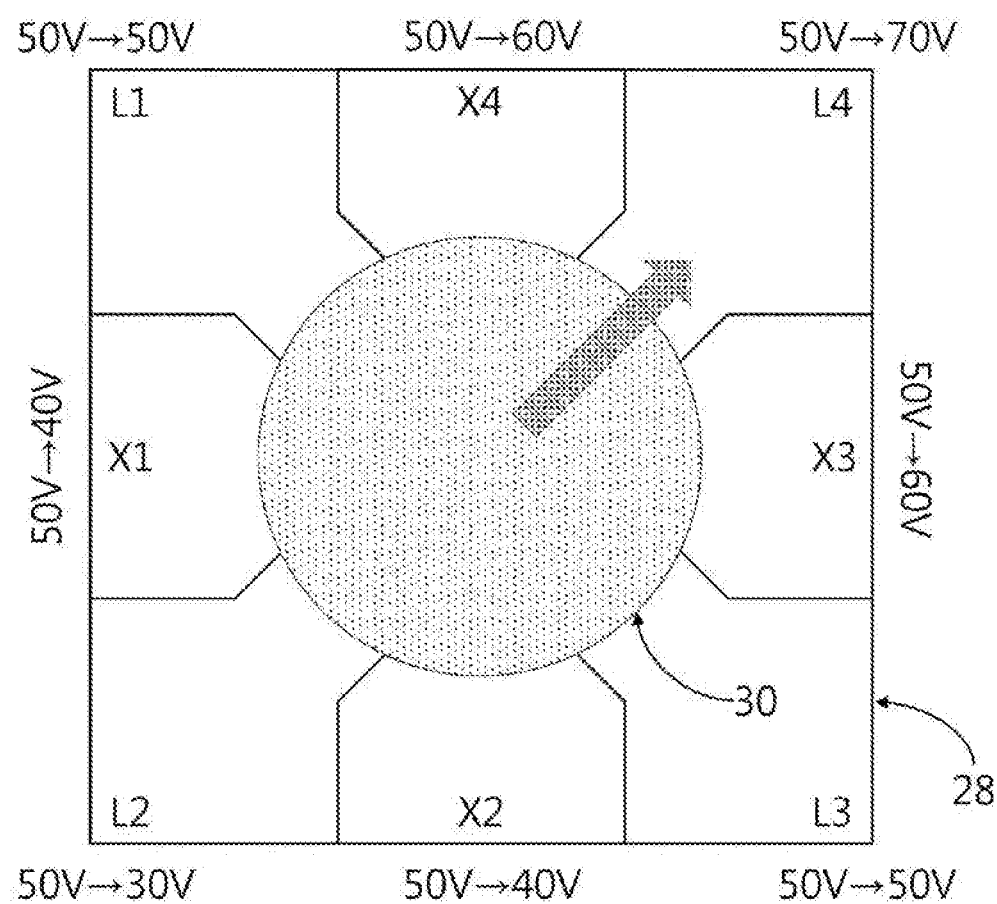

CAMERA MODULE INCLUDING LIQUID LENS AND OPTICAL DEVICE COMPRISING SAME

CROSS REFERENCE TO RELATED APPLICATIONS

This application is the National Phase of PCT International Application No. PCT/KR2018/000788, filed on Jan. 17, 2018, which claims priority under 35 U.S.C. 119(a) to Patent Application No. 10-2017-0008042, filed in the Republic of Korea on Jan. 17, 2017, all of which are hereby expressly incorporated by reference into the present application.

TECHNICAL FIELD

The present disclosure relates to a camera module including a liquid lens, and an optical device. More particularly, the present disclosure relates to a camera module including a liquid lens enabling adjustment of a focal length using electrical energy, and an optical device including the same.

BACKGROUND ART

People who use portable devices demand optical devices that have high resolution, are small, and have various photographing functions (an optical zoom-in/zoom-out function, an autofocus (AF) function, a hand tremor compensation or optical image stabilization (OIS) function, etc.). Such photographing functions may be realized by directly moving a plurality of lenses that are combined. In the case in which the number of lenses is increased, however, the size of an optical device may be increased. The autofocus and hand tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens moving apparatus is used to move the lens module. However, the lens moving apparatus has high power consumption, and an additional cover glass needs to be provided separately from the camera module in order to protect the lens moving apparatus, thus leading to an increase in the overall thickness of an optical device.

Therefore, research has been conducted on a liquid lens configured to electrically adjust the curvature of an interface between two kinds of liquid in order to perform autofocus and hand tremor compensation functions.

DISCLOSURE

Technical Problem

The present disclosure may provide a camera module including a lens enabling adjustment of the location of an interface between two kinds of liquid using electrical energy, an optical device, a lens-driving circuit, and a lens control method capable of more precisely controlling the location and movement of the interface.

In addition, the present disclosure may provide a lens-driving circuit capable of adjusting an interface formed in a lens not only in the north, south, east, or west direction but also in any other direction including a diagonal direction, such as northeast, southeast, northwest, or southwest.

However, the objects to be accomplished by the disclosure are not limited to the above-mentioned objects, and other objects not mentioned herein will be clearly understood by those skilled in the art from the following description.

Technical Solution

In one embodiment, a camera module may include a holder including a solid lens, a liquid lens coupled to the holder, a first substrate connected to the liquid lens and including a first terminal and a second terminal, a second substrate connected to the first substrate, and an image sensor disposed on the second substrate so as to be located at a position corresponding to the liquid lens. The liquid lens may include a first plate including a cavity in which a conductive liquid and a non-conductive liquid are disposed, a first electrode disposed on the first plate, a second electrode disposed under the first plate and including a plurality of electrode sectors, a second plate disposed on the first electrode, and a third plate disposed under the second electrode. The first substrate may connect the electrode sectors of the second electrode to the second substrate. The first terminal may be provided in a plural number and may be connected to the second substrate, and the second terminal may be provided in a plural number and may be connected to the electrode sectors of the second electrode. The number of the electrode sectors of the second electrode may be greater than the number of the first terminals.

In addition, the first electrode may include one electrode sector, the second electrode may include eight or more electrode sectors, and the first substrate may include four terminals connected to the second substrate.

In addition, the eight or more electrode sectors of the second electrode may include a first group including four electrodes supplying driving voltages in four directions perpendicular to each other, and a second group including four electrodes, one of which is disposed between every two of the four electrodes of the first group.

In addition, a driving voltage applied to each of the electrode sectors of the second group may have a level equal to an average level of driving voltages applied to two of the electrode sectors of the first group, which are adjacent to each of the electrode sectors of the second group.

In addition, the eight or more electrode sectors may be divided into a plurality of subgroups, each of which includes four electrodes, and the driving voltage may be divided into four driving voltages, and may be applied only to one of the subgroups.

In addition, the camera module may include an additional voltage generating circuit configured to generate an additional voltage using a voltage input from the first terminal and to output the additional voltage to the second terminal.

In another embodiment, an optical device may include a housing, at least one camera module disposed in the housing, and a display unit disposed in the housing and configured to output an image. The camera module may include a lens assembly including a liquid lens, including a first electrode including at least one electrode sector to control an interface formed by two different kinds of liquid and a second electrode including eight or more electrode sectors, and one or more solid lenses, a control circuit controlling voltages supplied to the first electrode and to the second electrode, and a connection unit connecting the individual electrode and the common electrode to the control circuit.

In still another embodiment, a camera module may include a holder including at least one solid lens, a liquid lens coupled to the holder and having a rectangular shape, a first substrate connected to the liquid lens and including a first terminal and a second terminal, a second substrate connected to the first substrate, and an image sensor disposed on the second substrate in an optical-axis direction of the liquid lens. The liquid lens may include a first plate including a cavity formed therein to accommodate a conductive liquid and a non-conductive liquid therein, a first electrode disposed on the first plate, a second electrode disposed under the first plate and including four electrode sectors disposed at corners of the liquid lens and four electrode sectors, one of which is disposed between every two of the four electrode sectors disposed at the corners, a second plate disposed on the first electrode, and a third plate disposed under the second electrode. The first substrate may connect the second electrode to the second substrate.

In addition, the first substrate may include eight terminals connected to the second substrate.

In addition, driving voltages supplied to eight electrode sectors of the second electrode may have at least three different levels.

In addition, among the driving voltages applied to eight electrode sectors of the second electrode, the highest driving voltage and the lowest driving voltage may be symmetrically applied with respect to the interface.

In addition, driving voltages having the same level may be applied to a pair of electrode sectors disposed symmetrically to each other with reference to an electrode sector to which the highest driving voltage is applied and an electrode sector to which the lowest driving voltage is applied.

However, the above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of a device according to the disclosure will be described below.

According to the disclosure, it is possible to more easily realize optical image stabilization (OIS) using a driving circuit, which is configured to provide an interface in eight directions in a lens so as to adjust a focal length.

In addition, according to the disclosure, it is possible to more precisely control an interface formed by two kinds of liquid in a lens by changing the arrangement of electrodes in the lens and a connection part for supplying a driving voltage to the lens without changing a driving circuit driving the lens.

However, the effects achievable through the disclosure are not limited to the above-mentioned effects, and other effects not mentioned herein will be clearly understood by those skilled in the art from the following description.

DESCRIPTION OF DRAWINGS

FIG. 1 illustrates a camera module.
FIG. 2 illustrates a lens assembly including a liquid lens.
FIGS. 3a and 3b illustrate a first example of the liquid lens.
FIG. 4 illustrates the optical image stabilization (OIS) operation of the liquid lens shown in FIG. 3b.
FIG. 5 illustrates the structure of the liquid lens.
FIG. 6 illustrates a connection part of the liquid lens and a driving circuit.
FIG. 7 illustrates a method of driving the liquid lens.
FIG. 8 illustrates a second example of the liquid lens and a first example of the optical image stabilization (OIS) operation.
FIG. 9 illustrates a second example of the liquid lens and a second example of the optical image stabilization (OIS) operation.
FIG. 10 illustrates the internal configuration of the connection part shown in FIG. 6.
FIG. 11 illustrates an adder circuit included in the connection part shown in FIG. 10.
FIG. 12 illustrates the liquid lens and a control module.
FIG. 13 illustrates a connection part of the liquid lens and the driving circuit.
FIG. 14 illustrates the arrangement of electrodes of the liquid lens and a direction in which the optical image stabilization (OIS) operation is performed.
FIGS. 15a and 15b illustrate examples of the optical image stabilization (OIS) operation.

BEST MODE

Reference will now be made in detail to the preferred embodiments, examples of which are illustrated in the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure covers all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

With relation to a camera module that is mounted in a small-sized portable device and includes a plurality of lenses, it is not easy to realize an optical zoom-in/zoom-out function, an autofocus (AF) function, and a hand tremor compensation or optical image stabilization (OIS) function through a method of changing a focal length by adjusting the distance between the lenses. One of the methods for solving the above problem is to make a lens using liquid, rather than using transparent and hard glass or plastic. In the case in which a lens is made of liquid, the focal length of the lens may be adjusted through an electrowetting phenomenon. A liquid lens using an electrowetting phenomenon may reduce the size of a camera module compared to a configuration in which a focal length is adjusted by moving a lens (adjusting the distance between lenses), and may consume a small amount of power compared to a configuration in which a lens is mechanically moved using a motor or the like.

FIG. 1 illustrates an example of a camera module 10 according to an embodiment of the present disclosure.

Referring to FIG. 1, the camera module 10 may include a lens assembly 22, a control circuit 24, and an image sensor 26. The liquid lens is adjusted in focal length corresponding to a driving voltage applied between an electrode sector of a first electrode (or a common electrode) and a plurality of electrode sectors of a second electrode (or an individual electrode). The control circuit transmits a signal for supplying the driving voltage to the liquid lens. The image sensor is aligned with the lens assembly 22, and converts the light transmitted through the lens assembly 22 into an electrical signal.

The camera module 10 may include a plurality of circuits 24 and 26, disposed on a single printed circuit board (PCB), and a lens assembly 22, including a plurality of lenses. However, this is merely illustrative, and the scope of the disclosure is not limited thereto. The control circuit 24 may be designed differently in accordance with the specifications required for a camera module. In particular, in order to reduce the level of the operating voltage applied to the lens assembly 22, the control circuit 24 may be implemented as a single chip. As a result, it is possible to further reduce the size of a camera module that is mounted in a portable device.

FIG. 2 illustrates an example of the lens assembly 22 included in the camera module 10.

Referring to FIG. 2, the lens assembly 22 may include a first lens unit 100, a second lens unit 200, a liquid lens unit 300, a holder 400, and a connection unit 500. The illustrated structure of the lens assembly 22 is just one example, and the structure of the lens assembly 22 may be changed depending on the specifications required for the camera module. For example, in the illustrated example, the liquid lens unit 300 is disposed between the first lens unit 100 and the second lens unit 200. However, in another example, the liquid lens unit 300 may be disposed on the first lens unit 100 (or on the front surface of the first lens unit), and the second lens unit may be omitted. The liquid lens may include a first plate and an electrode. The liquid lens may include a first plate, in which a cavity accommodating a conductive liquid and a non-conductive liquid therein is formed, and an electrode disposed on or under the first plate. The liquid lens may include one or two or more electrodes. A first electrode may be disposed on the first plate, and a second electrode may be disposed under the first plate. Each of the first electrode and the second electrode may include at least one electrode sector. In one embodiment, the first electrode may include one electrode sector, and the second electrode may include a plurality of electrode sectors. Each electrode sector may be an electrode region that receives a voltage independently. The cavity in the first substrate may have an inclined side surface. The inclined side surface of the cavity shown in FIG. 2 is formed such that the cavity is gradually expanded toward the upper portion of the liquid lens in a direction perpendicular to the optical axis. However, depending on the embodiment, the cavity in the liquid lens may be formed so as to be gradually expanded toward the lower portion of the liquid lens. The liquid lens may include a second plate disposed on the first plate or a third plate disposed under the first plate.

In the camera module, the liquid lens may be coupled to a holder containing a solid lens. In this case, the liquid lens may include at least one substrate, which is connected to a sensor substrate on which the image sensor is mounted. In one embodiment, a connection part of the liquid lens may be implemented as a first substrate, and may be physically and/or electrically connected to a second substrate on which the image sensor is mounted. The connection part may further include a third substrate, and may be connected to a second substrate on which the liquid lens and the image sensor are mounted. Further, in the camera module, the cavity in the liquid lens unit 300 shown in FIG. 2, in which the conductive liquid and the non-conductive liquid are disposed, may have an upper opening and a lower opening, which have different sizes from each other. For example, the liquid lens disposed in the camera module may be formed such that the upper opening is larger than the lower opening or such that the lower opening is larger than the upper opening.

The first lens unit 100 is disposed at the front side of the lens assembly 22, and receives light from the outside of the lens assembly 22. The first lens unit 100 may include at least one lens, or two or more lenses may be aligned along a center axis PL to form an optical system.

The first lens unit 100 and the second lens unit 200 may be mounted in the holder 400. Here, a through-hole may be formed in the holder 400, and the first lens unit 100 and the second lens unit 200 may be disposed in the through-hole. Further, the liquid lens unit 300 may be inserted into the space between the first lens unit 100 and the second lens unit 200 in the holder 400.

Meanwhile, the first lens unit 100 may include an exposure lens 110. Here, the exposure lens 110 is a lens that may protrude so as to be exposed to the outside of the holder 400. In the case of the exposure lens 110, the lens surface thereof may be damaged due to exposure to the outside. If the lens surface is damaged, the quality of an image captured by the camera module may be deteriorated. In order to prevent or suppress damage to the surface of the exposure lens 110, a method of disposing a cover glass, a method of forming a coating layer, or a method of forming the exposure lens 110 using a wear-resistant material for preventing damage to the surface of the exposure lens may be applied.

The second lens unit 200 may be disposed at the rear of the first lens unit 100 and the liquid lens unit 300, and the light incident on the first lens unit 100 from the outside may pass through the liquid lens unit 300 and may be incident on the second lens unit 200. The second lens unit 200 may be spaced apart from the first lens unit 100, and may be disposed in the through-hole formed in the holder 400.

Meanwhile, the second lens unit 200 may include at least one lens, and when two or more lenses are included, the lenses may be aligned along the center axis PL to form an optical system.

The liquid lens unit 300 may be disposed between the first lens unit 100 and the second lens unit 200, and may be inserted into an insertion hole 410 formed in the holder 400. The liquid lens unit 300 may also be aligned along the center axis PL in the same manner as the first lens unit 100 and the second lens unit 200.

The liquid lens unit 300 may include a lens region 310. The lens region 310 may be a region that light that has passed through the first lens unit 100 penetrates, and may contain a liquid in at least a portion thereof. For example, two kinds of liquid, i.e. a conductive liquid and a non-conductive liquid, may be contained in the lens region 310, and the conductive liquid and the non-conductive liquid may form an interface therebetween without mixing with each other. The interface between the conductive liquid and the non-conductive liquid may be deformed by a driving voltage applied thereto through the connection unit 500, whereby the curvature of the interface of the liquid lens unit 300 and the focal length of the liquid lens unit may be changed. When deformation of the interface and the change in the curvature thereof are controlled, the liquid lens unit 300, the lens assembly 22 including the same, and the camera module may perform an optical zoom-in/zoom-out function, an autofocus (AF) function, a hand tremor compensation or optical image stabilization (OIS) function, etc.

FIGS. 3a and 3b illustrate a first example of a liquid lens. Specifically, FIG. 3a illustrates a liquid lens 28, which is included in the lens assembly 22 (refer to FIG. 2) and which includes a first electrode C0 (a common electrode) including at least one electrode sector and a second electrode (an individual electrode) including at least one electrode sector L1, L2, L3 and L4. FIG. 3b illustrates an interface 30 included in the liquid lens 28 and a second electrode (an individual electrode) including a plurality of electrode sectors L1, L2, L3 and L4 for controlling the interface 30.

Referring to FIGS. 3a and 3b, in one example, the liquid lens 28, the interface of which is adjusted corresponding to a driving voltage, may receive a driving voltage through the electrode sectors L1, L2, L3 and L4 of the second electrode (the individual electrode), which are disposed at the same angular intervals from each other in four different directions. When the driving voltage is applied to the liquid lens through the electrode sectors L1, L2, L3 and L4 of the second electrode (the individual electrode), the interface 30 between the conductive liquid and the non-conductive liquid disposed in the lens region 310 may be deformed. The degree and type of deformation of the interface 30 between the conductive liquid and the non-conductive liquid may be controlled by the driving voltage supplied to realize an AF function or an OIS function.

The interface 30 formed between the two kinds of liquid in the liquid lens 28 may be controlled by a driving voltage applied between the four electrode sectors L1, L2, L3 and L4 of the second electrode (the individual electrode) and the first electrode C0 (the common electrode). For example, the sum of the levels of individual driving voltages, into which the driving voltage is divided, may be determined by the autofocus (AF) function of the camera module, and variation in the individual driving voltages may be determined by the optical image stabilization (OIS) function.

The focal length of the interface 30 when the individual driving voltage of 50 V is applied between each of the four electrode sectors L1, L2, L3 and L4 of the second electrode and the first electrode C0 (the common electrode) may be shorter than the focal length of the interface 30 when the individual driving voltage of 40 V is applied between each of the four electrode sectors L1, L2, L3 and L4 of the second electrode and the first electrode C0 (the common electrode). As the sum of the levels of individual driving voltages applied to the four electrode sectors L1, L2, L3 and L4 of the second electrode increases, the focal length of the interface 30 may be shortened.

Meanwhile, the levels of individual driving voltages applied between the four electrode sectors L1, L2, L3 and L4 of the second electrode and the first electrode C0 (the common electrode) may not be the same as each other. As such, in the case in which individual driving voltages of different levels are applied, the curvature of the interface 30 may become asymmetrical, and the interface may be biased in a certain direction. For example, when the individual driving voltages applied between two electrode sectors L1 and L2 of the second electrode and the first electrode C0 (the common electrode) are higher than the individual driving voltages applied between the two remaining electrode sectors L3 and L4 of the second electrode and the first electrode C0 (the common electrode), the curvature of the interface 30 that is close to the two electrode sectors L1 and L2 of the second electrode may become greater than the curvature of the interface that is close to the two remaining electrode sectors L3 and L4 of the second electrode. Thereby, the interface 30 may be biased toward a region between the two electrode sectors L1 and L2 of the second electrode (e.g. in the leftward direction).

FIG. 4 illustrates the optical image stabilization (OIS) operation of the liquid lens described with reference to FIG. 3b.

As shown in the drawing, in order to change an interface 30A in the liquid lens 28 to an interface 30B biased to the right, the levels of individual driving voltages applied to the four electrode sectors L1, L2, L3 and L4 of the second electrode, which are dispose around the interface 30A or 30B, may be adjusted.

For example, when the level of the individual driving voltage applied to each of the four electrode sectors L1, L2, L3 and L4 of the second electrode is 50 V, the interface 30A may be located at the center of the lens. At this time, the sum of the levels of individual driving voltages applied to the four electrode sectors L1, L2, L3 and L4 of the second electrode is 200 V.

Thereafter, a voltage of 40 V may be applied to each of the first electrode sector L1 and the second electrode sector L2 of the second electrode, and a voltage of 60 V may be applied to each of the third electrode sector L3 and the fourth electrode sector L4 of the second electrode. At this time, the sum of the levels of individual driving voltages applied to the four electrode sectors L1, L2, L3 and L4 of the second electrode is not changed, but is still 200 V. Therefore, the focal lengths of the two interfaces 30A and 30B for performing the autofocus (AF) may be the same as or similar to each other. However, since the individual driving voltages applied to the third and fourth electrode sectors L3 and L4 of the second electrode are higher than the individual driving voltages applied to the first and second electrode sectors L1 and L2 of the second electrode, the interface 30B may be biased from the center position to the right.

In the manner described above, individual driving voltages may be applied to the four electrode sectors L1, L2, L3 and L4 of the second electrode so that the interface 30A or 30B is biased not only in the rightward direction but also in the leftward, upward, or downward direction. However, in this embodiment, it may be difficult to move the interface 30A or 30B in, for example, an upward-rightward or downward-rightward direction, rather than in the above four directions.

FIG. 5 is a cross-sectional view showing the structure of the liquid lens.

As shown in the drawing, the liquid lens may include a first plate 14, in which a cavity accommodating a conductive liquid and a non-conductive liquid therein is formed, a second plate 12 disposed on the first plate, and a third plate 16 disposed under the first plate. The conductive liquid and the non-conductive liquid may form an interface 30 therebetween. In addition, the liquid lens may include a first electrode 32 and a second electrode 34 for controlling the interface 30. The first electrode 32 may be disposed on (or under) the first plate, and the second electrode 34 may be disposed under (or on) the first plate. An insulation layer (not shown) may be disposed between the liquid and the first electrode or between the liquid and the second electrode in order to prevent change in the property of the liquid due to contact between the liquid and the first electrode or the second electrode.

The first electrode 32 and the second electrode 34 may be connected to a control circuit (not shown) for supplying a driving voltage via connection parts 42 and 44. Here, the control circuit may include a circuit for generating and supplying a driving voltage for adjusting the curvature, the center point, and the inclination of the interface 30 of the liquid lens. The control circuit may generate four individual driving voltages that are to be applied to the four electrode sectors L1, L2, L3 and L4 of the second electrode, which is included in the liquid lens 28 as shown in FIG. 4.

A flexible printed circuit board (FPCB) may be used as each of the connection parts 44 and 42 connecting the control circuit to the electrode sector 32 of the liquid lens. The flexible printed circuit board (FPCB) may include a simple circuit as well as at least one wiring for transmitting a driving voltage. Depending on the embodiment, the connection parts 44 and 42 may be made using various materials. One or two or more connection parts may be disposed. In one embodiment, when two connection parts 42 and 44 are included, the first connection part may be disposed on (or under) the first electrode, and the second connection part may be disposed under (or on) the second electrode. The first connection part may be a first substrate or a metal plate of a metal material, and the second connection part may be a second substrate or a metal plate.

The liquid lens included in the camera module may include a first electrode 32 (a common electrode), which includes at least one electrode sector, and a second electrode 34 (an individual electrode), which includes at least eight electrode sectors, in order to control the interface 30 formed by two different kinds of liquid. The second electrode 34 (the individual electrode) may be disposed on the inclined surface of the cavity in the first plate. The second electrode 34 (the individual electrode) may be disposed under the first plate and on the inclined surface on which the liquid in the first plate is disposed. An insulation layer may be disposed between the second electrode and the liquid disposed in the cavity in the first plate. The liquid lens may be inserted into or included in the lens assembly including at least one solid lens, which has been described above with reference to FIG. 1. The camera module may further include a control circuit or a driving circuit for supplying a driving voltage to the second electrode including at least eight electrode sectors and to the first electrode including at least one electrode sector, which are included in the liquid lens, and a connection part for connecting the control circuit or the driving circuit to the first electrode or to the second electrode including at least eight electrode sectors. The connection part may be a substrate or a metal plate.

FIG. 6 illustrates a connection part of the liquid lens and the driving circuit.

As shown in the drawing, the connection part for electrically connecting the liquid lens to the driving circuit (e.g. the control circuit) may include a first connection part 42 for supplying individual driving voltages to the respective electrode sectors of the second electrode using a flexible printed circuit board (FPCB), and a second connection part 44 for supplying a voltage to the first electrode using a flexible printed circuit board (FPCB) or a metal plate. The connection part may include terminals electrically and/or physically connected to the first electrode or the second electrode of the liquid lens, and terminals electrically and/or physically connected to the sensor substrate on which the image sensor is mounted. Referring to the embodiment shown in FIG. 6, the terminals electrically and/or physically connected to the sensor substrate are denoted by L1, L2, L3, L4 and C0 on the right side in the drawing, and the terminals electrically and/or physically connected to the electrode of the liquid lens are denoted by circled letters L1, X4, L4, X3, L3, X2, L2 and X1, which are arranged in the clockwise direction. The first connection part may be a first substrate. When the first connection part is a first substrate, the first substrate may include a plurality of first terminals and a plurality of second terminals. The first terminals may be connected to the second substrate on which the image sensor is mounted, and the second terminals may be connected to the second electrode sectors. Here, the number of electrode sectors of the second electrode may be larger than the number of first terminals. The first substrate may receive a voltage through the first terminals, and may apply the voltage to the electrode sectors of the liquid lens through the second terminals. The first substrate may include an additional voltage generating circuit, which generates an additional voltage using the voltage input through the first terminals. For example, the additional voltage generating circuit may be a circuit that receives four levels of voltages and generates eight levels of voltages. The additional voltage generating circuit may include a circuit that functions as an adder. The additional voltage generating circuit may include a bypass circuit. The additional voltage generating circuit may further include a switch circuit. It is possible to transmit a greater number of voltages, including a voltage additionally generated by the additional voltage generating circuit, than the number of voltages input through the first terminals to the liquid lens through the second terminals. Thereby, since the number of connection parts between the first substrate and the second substrate is reduced to below the number of voltages required for the operation, the assembly process may be simplified, and the size of the camera module may be reduced. Thus, the number of first terminals may be smaller than the number of electrode sectors of the second electrode.

The first connection part 42 may be electrically connected to eight electrode sectors L1, L2, L3, L4, X1, X2, X3 and X4, rather than to four electrode sectors. For example, at least eight electrode sectors may be divided into a first electrode group, which includes four electrode sectors for supplying individual driving voltages in four directions perpendicular to each other, and a second electrode group, which includes electrode sectors disposed between every two of the four electrode sectors included in the first electrode group. One of the first electrode group and the second electrode group may be disposed at the corner of the liquid lens of a rectangular shape. The remaining electrode group, which is not disposed at the corner, may include electrode sectors, one of which is disposed between every two of the electrode sectors included in the electrode group disposed at the corner. The second connection part 44 is used to apply a common voltage (e.g. a ground voltage, 0 V, DC, or AC), and may have a shape or a structure corresponding to the first connection part 42. However, the value of the common voltage may not be fixed, but may be changed.

In one embodiment, the first connection part 42 may transmit four individual driving voltages, which are transmitted from the control circuit or the driving circuit, to the eight electrode sectors of the second electrode. The eight electrode sectors L1, L2, L3, L4, X1, X2, X3 and X4 of the second electrode included in the liquid lens may be divided into two subgroups. Each subgroup may include four electrode sectors. For example, the first group may include four electrode sectors L1, L2, L3 and L4, and the second group may include the four remaining electrode sectors X1, X2, X3 and X4 of the second electrode. The electrode sectors L1, L2, L3, L4, X1, X2, X3 and X4 of the second electrode may be disposed at the same angular intervals from each other with respect to the interface 30 (refer to FIG. 5) included in the liquid lens. Further, the electrode sectors included in each subgroup may also be disposed at the same angular intervals from each other.

Although an embodiment in which the liquid lens includes a second electrode including four or eight electrode sectors has been described, the embodiment is not limited as to the number of electrode sectors of the second electrode. The liquid lens may include less than or more than eight electrode sectors. However, the number of electrode sectors may be a multiple of four, and the number of subgroups, each including four electrode sectors, may be three, four, or more. Hereinafter, for the sake of convenience of explanation, a configuration in which the liquid lens includes eight electrode sectors, i.e. two subgroups, will be described by way of example.

FIG. 7 illustrates a method of driving the liquid lens.

As shown in the drawing, a method of driving the liquid lens may include a step of generating first individual driving voltages to be applied to the electrode sectors of the second electrode (62), and a step of, when the first individual driving voltages have the same level or two or more different levels, applying the first individual driving voltages to all of the subgroups or to one of the subgroups (64). Here, the liquid lens may include a first electrode, which includes one electrode sector, and a second electrode, which includes eight electrode sectors and a plurality of subgroups, in order to adjust the interface formed by the two kinds of liquid. Further, the control circuit or the driving circuit may generate a driving voltage to be applied to the first electrode including one electrode sector and/or to the subgroups of the second electrode, which are included in the liquid lens.

When the first individual driving voltages generated by the control circuit or the driving circuit have three different levels, the method of controlling the liquid lens may further include a step of converting the first individual driving voltages into two different levels of second individual driving voltages (66), and a step of applying the second individual driving voltages to the other one of the subgroups (66). Here, the second individual driving voltage may be equal to half the sum of the two first individual driving voltages to be applied to adjacent electrodes.

Here, the first individual driving voltages and the second individual driving voltages may be applied to different subgroups. The control circuit or the driving circuit for driving the liquid lens may generate four first individual driving voltages, but may not generate a plurality of individual driving voltages that have different levels corresponding to the different subgroups. The reason for this is that the control circuit or the driving circuit is designed to drive the liquid lens including four electrode sectors. In the case in which the liquid lens includes a plurality of subgroups, each including four electrode sectors, a separate device for generating individual driving voltages to be applied to the subgroups may be required.

In addition, the method of controlling the liquid lens may further include a step of determining whether to apply the first individual driving voltages to one of the subgroups. It is necessary to determine whether to transmit the first individual driving voltages, which are transmitted from the control circuit or the driving circuit to some of the subgroups included in the liquid lens, to a designated electrode sector (or a designated subgroup) and whether to apply the first individual driving voltages to any other electrode sector (or any other subgroup) through a conversion process.

The determination as to which subgroup to apply the individual driving voltages to may be made in response to a control signal transmitted from the driving circuit or the control circuit. Depending on the embodiment, the determination as to which subgroup to apply the individual driving voltages to may be determined in accordance with the levels of the first individual driving voltages. This is because the level of the driving voltage generated by the driving circuit or the control circuit may vary depending on which subgroup the individual driving voltages are applied to.

FIG. 8 illustrates a second example of the liquid lens and a first example of the optical image stabilization (OIS) operation.

As shown in the drawing, it is possible to move the interface 30A of the liquid lens, which includes eight electrode sectors L1, L2, L3, L4, X1, X2, X3 and X4 of the second electrode, i.e. two subgroups, one of which includes four electrode sectors L1, L2, L3 and L4 and the other one of which includes four electrode sectors X1, X2, X3 and X4, to the right by changing the supply voltage. At this time, the interface 30A of the liquid lens may not be physically moved to the right so as to be formed at a new position 30B, but a position at which an image that has passed through the interface 30A or 30B is formed may be moved due to a change in the curvature of the interface 30A or 30B.

For example, when a driving voltage of 50 V is supplied to each of the four electrode sectors L1, L2, L3 and L4 included in the first group, the interface 30A may be located at the center of the lens. Even when a driving voltage of 50 V is supplied to the second group as well as the first group, the interface 30A may be located at the center of the lens. Thereafter, in order to perform the optical image stabilization (OIS) operation (e.g. when the position of the lens needs to be adjusted due to tilting of the camera module, hand tremor, etc.), different levels of individual supply voltages may be applied to the first group, which includes the four electrode sectors L1, L2, L3 and L4 of the second electrode. The driving voltage applied to each of the first and second electrode sectors L1 and L2 may be reduced from 50 V to 40 V, and the driving voltage applied to each of the third and fourth electrode sectors L3 and L4 may be increased from 50 V to 60 V. In this case, the curvature of the interface 30 (refer to FIG. 5) may change, and accordingly the position at which an image that has passed through the interface 30B is formed may be moved to the right. At this time, a voltage may be applied to each of the electrode sectors of the second group, or may not be applied thereto. In the case in which a voltage is applied to the second group, the level of the voltage applied to each of the electrode sectors of the second group may be determined based on the voltages applied to the electrode sectors of the first group that are located on both sides of the corresponding electrode sector of the second group (e.g. the average level of the voltages applied to L1 and L2).

As described above, an image that has passed through the interface may be moved to the right, left, up, or down by changing the individual supply voltages applied to the first group including the four electrode sectors L1, L2, L3 and L4 of the second electrode. However, when it is desired to move the interface in an upward-rightward direction, it may be difficult to realize this movement of the interface merely by changing the levels of the individual supply voltages applied to the first group including the four electrode sectors L1, L2, L3 and L4 of the second electrode.

FIG. 9 illustrates a second example of the liquid lens and a second example of the optical image stabilization (OIS) operation.

As shown in the drawing, when it is desired to move the interface 30A positioned at the center of the liquid lens in a diagonal direction, individual supply voltages may be applied to the four electrode sectors X1, X2, X3 and X4 included in the second group among the plurality of subgroups (i.e. the eight electrode sectors of the second electrode) included in the second electrode of the liquid lens.

The control circuit or the driving circuit for applying the driving voltage to the liquid lens generates individual driving voltages to be applied to the four electrode sectors L1, L2, L3 and L4 included in the first group or to the four electrode sectors X1, X2, X3 and X4 included in the second group. When the interface 30A is located at the center of the liquid lens, a voltage of 50 V may be applied to each of the four electrode sectors L1, L2, L3 and L4 of the first group or to the four electrode sectors X1, X2, X3 and X4 of the second group.

Therefore, in order to realize the interface 30B moved in a diagonal direction, it is necessary to adjust voltages applied to the four electrode sectors L1, L2, L3 and L4. For example, the voltage applied to each of the first and third electrode sectors L1 and L3 may be maintained at 50 V, whereas the individual driving voltages applied to the second and fourth electrode sectors L2 and L4 may be respectively adjusted to 30 V and 70 V. Here, the individual driving voltages, the levels of which have been adjusted, may not be applied to the four electrode sectors L1, L2, L3 and L4, but may be changed by the connection part located between the liquid lens and the control circuit or between the liquid lens and the driving circuit. For example, an individual driving voltage of 40 V may be generated by adding the individual driving voltage of 50 V applied to the first electrode sector L1 and the individual driving voltage of 30 V applied to the second electrode sector L2 and dividing the sum thereof in half, and the individual driving voltage of 40 V may be applied to the fifth electrode sector X1 located between the first electrode sector L1 and the second electrode sector L2. In the same manner, individual driving voltages of 40 V, 60 V and 60 V may be respectively applied to the sixth, seventh, and eighth electrode sectors X2, X3 and X4. When individual driving voltages are applied to the second group including the four electrode sectors X1, X2, X3 and X4, individual driving voltages may not be applied to the first group including the four electrode sectors L1, L2, L3 and L4.

Referring to FIGS. 8 and 9, when an individual driving voltage is applied to one of the subgroups included in the liquid lens, the interface may be moved not only in the leftward, rightward, upward, or downward direction but also in a diagonal direction. More specifically, when it is desired to move the interface in the leftward, rightward, upward, or downward direction, the control circuit or the driving circuit may generate individual driving voltages having two different levels (e.g. 40 V and 60 V shown in FIG. 8). When it is desired to move the interface in a diagonal direction, the control circuit or the driving circuit may generate individual driving voltages having three different levels (e.g. 30 V, 50 V and 70 V shown in FIG. 9).

As described above, the type of the individual driving voltages generated by the control circuit or the driving circuit may vary depending on which one of the subgroups the individual driving voltages are applied to. Using this, even if the control circuit or the driving circuit does not output any separate control signal for determining which one of the subgroups the individual driving voltages are to be applied to, it is possible to determine which one of the subgroups the individual driving voltages are to be applied to or whether to apply the individual driving voltages without changing the same or after changing the same by sensing the levels of the individual driving voltages output from the control circuit or the driving circuit.

Depending on the embodiment, a circuit or a logic for changing the above-described individual driving voltages or determining an electrode to which the individual driving voltage is to be applied may be included in the connection part connecting the control circuit or the driving circuit to the electrode sector of the liquid lens.

FIG. 10 illustrates the internal configuration of the connection part described above with reference to FIG. 6.

As shown in the drawing, the connection part for connecting the control circuit or the driving circuit to at least eight electrode sectors L1, L2, L3, L4, X1, X2, X3 and X4 of the liquid lens may include a circuit, a logic, or a module capable of changing the individual driving voltages applied to the connection part. More specifically, the connection part may include a plurality of transmission parts 52 and a determination circuit 58.

The transmission parts 52 may receive individual driving voltages to be applied to two adjacent electrode sectors (e.g. L1 and L2), and may transmit the individual driving voltage to one of the electrode sector L2 of the first group and the electrode sector X1 of the second group. The transmission parts 52 may be controlled by the determination circuit 58, and may determine whether to transmit the individual driving voltages applied thereto to the electrode sectors of the first group without changing the same or whether to transmit the individual driving voltages applied thereto to the electrode sectors of the second group after changing the same. The determination circuit 58 may sense the individual driving voltages (L1, L2, . . . ) applied from the control circuit or the driving circuit, and, when the four individual driving voltages have three different levels, may determine to transmit the individual driving voltages to the electrode sectors of the second group. On the other hand, when the four individual driving voltages have the same level or have two different levels, the determination circuit 58 may determine to transmit the individual driving voltages to the electrode sectors of the first group.

Depending on the embodiment, the connection part may receive a control signal Ctrl from the outside without provision of the determination circuit 58. At this time, the control signal Ctrl may be input from the control circuit or the driving circuit.

The transmission parts 52 may include a switch circuit 54, which is configured to switch the individual driving voltages applied in response to the control signal Ctrl or applied by the determination circuit 58, and an adder circuit 56, which is connected to the switch circuit 54 so as to output an individual driving voltage having a level obtained by adding two different individual driving voltages and dividing the sum thereof in half.

FIG. 11 illustrates the adder circuit included in the connection part shown in FIG. 10.

As shown in the drawing, the adder circuit may receive two different first individual driving voltages L1 and L2, and may output a second individual driving voltage X1, which has a level equal to half the sum of the individual driving voltages L1 and L2.

The adder circuit may include an operational amplifier op-amp and a plurality of resistors. Here, the resistance values of the first, second and third resistors Ra, Rb and Rc may be the same, and the resistance values of the fourth and fifth resistors Rd and Re may be the same.

Specifically, two currents may flow through the first and second resistors Ra and Rb, which have the same resistance value, and may be summed at a node A, and the added current I may flow through the third resistor Rc, which has the same resistance value as the first and second resistors. At this time, the sum of the first individual driving voltages L1 and L2 may be applied to the output terminal of the operational amplifier op-amp, and may be distributed to the fourth and fifth resistors Rd and Re, which have the same resistance value, whereby a second individual driving voltage X1, which has a level equal to half the sum of the first individual driving voltages L1 and L2, may be output.

FIG. 12 illustrates the liquid lens and the control module.

As shown in the drawing, the liquid lens 28, which includes the interface 30 formed by two different kinds of liquid, may include eight individual electrodes L1, L2, L3, L4, X1, X2, X3 and X4 and a common electrode C0. The driving circuit 52 may supply driving voltages to the eight individual electrodes L1, L2, L3, L4, X1, X2, X3 and X4 and the common electrode C0 in order to control the interface 30 of the liquid lens 28.

The control module for controlling the liquid lens may include the driving circuit 52, an optical image stabilizer (OIS) 54, and a gyro sensor 56. The driving circuit 52 may generate eight individual driving voltages to be respectively transmitted to the eight individual electrodes. The driving circuit 52 may receive an adjustment parameter for determining the levels of the individual driving voltages from the optical image stabilizer 54 in order to determine the levels of the eight individual driving voltages using the voltage of the power supply.

For example, the sum of the driving voltages, which are generated by the driving circuit 52 and are applied to at least eight individual electrodes, may be determined by the autofocus (AF) function of the camera module, and variation in the individual driving voltages, into which the driving voltages are divided, may be determined by the optical image stabilization (OIS) function of the camera module.

For example, information on the motion of the camera module may be obtained from the gyro sensor 56 included in the camera module. Information on the motion of the camera module may be transmitted to the optical image stabilizer 54, and the optical image stabilizer 54 may calculate a value, based on which the lens is adjusted in order to compensate for the motion of the camera module. The inclination and the curvature of the interface 30 formed by the two kinds of liquid in the liquid lens 28 may be adjusted in accordance with the compensation value calculated by the optical image stabilizer 54, whereby an image formed by an optical signal, which has passed through the liquid lens 28, may be moved in a specific direction. This operation control may be realized because the curvature of the interface 30 in the liquid lens 28 is changed in accordance with the levels of the voltages applied to the individual electrodes.

Further, the driving circuit 52 may determine eight individual driving voltages based on data determined through lens calibration with respect to the liquid lens 28. The liquid lens 28 may have a minute characteristic difference due to a processing error in the manufacturing process thereof. Such a difference may be converted into data through lens calibration, and may be used to control the lens.

FIG. 13 illustrates a connection part of the liquid lens and the driving circuit.

As shown in the drawing, the connection part for connecting the liquid lens to the driving circuit (e.g. the control circuit) may include a first connection part 42 for supplying individual driving voltages to the respective individual electrodes using a flexible printed circuit board (FPCB) and a second connection part 44 for supplying a common voltage using a flexible printed circuit board (FPCB).

The first connection part 42 may be electrically connected to the eight individual electrodes L1, L2, L3, L4, X1, X2, X3 and X4. The second connection part 44 is configured to apply a common voltage (e.g. a ground voltage, 0 V, a common DC, or a common AC), and may have a structure corresponding to the first connection part 42. However, the second connection part 44 may apply the same common voltage to all of the electrodes connected thereto.

Specifically, the first connection part 42 may transmit eight individual driving voltages, which are transmitted from the control circuit or the driving circuit, to the eight individual electrodes. The eight individual electrodes L1, L2, L3, L4, X1, X2, X3 and X4 included in the liquid lens may be disposed at the same angular intervals from each other with respect to the interface 30 of the liquid lens.

Depending on the embodiment, the liquid lens may include more than eight individual electrodes. However, the number of individual electrodes may be a multiple of four. Hereinafter, for the sake of convenience of explanation, a configuration in which the liquid lens includes eight individual electrodes, i.e. two subgroups, will be described by way of example.

FIG. 14 illustrates the arrangement of the electrodes of the liquid lens and a direction in which the optical image stabilization (OIS) operation is performed.

As shown in the drawing, it is possible to move the interface 30A of the liquid lens, which includes eight individual electrodes L1, L2, L3, L4, X1, X2, X3 and X4 to the left or to the right by changing the supply voltage. At this time, the interface 30A of the liquid lens may not be physically moved to the left or to the right so as to be formed at a new position 30B or 30C, but a position at which an image that has passed through the interface 30A, 30B or 30C is formed may be moved due to change in the curvature of the interface 30A, 30B or 30C.

FIGS. 15a and 15b illustrate examples of the optical image stabilization (OIS) operation. Specifically, FIG. 15a illustrates individual driving voltages applied to the liquid lens 28 in order to move an image that has passed through the liquid lens to the left, and FIG. 15b illustrates individual driving voltages applied to the liquid lens 28 in order to move an image that has passed through the liquid lens in a diagonal direction, specifically in an upward-rightward direction.

Referring to FIG. 15a, when a driving voltage of 50 V is supplied to each of the eight individual electrodes L1, L2, L3, L4, X1, X2, X3 and X4, the interface 30A (refer to FIG. 8) may be located at the center of the lens.

Thereafter, in order to perform the optical image stabilization (OIS) operation (i.e. when the position of the lens needs to be adjusted due to tilting of the camera module, hand tremor, etc., e.g. when the position 30A at which an image that has passed through the interface needs to be moved to the left position 30B (refer to FIG. 8)), different levels of individual supply voltages may be applied to the eight individual electrodes L1, L2, L3, L4, X1, X2, X3 and X4. For example, in order to move the interface to the left, the driving voltage applied to each of the first and second individual electrodes L1 and L2 may be increased from 50 V to 60 V, and the driving voltage applied to each of the third and fourth individual electrodes L3 and L4 may be reduced from 50 V to 40 V. Further, the driving voltage applied to the fifth individual electrode X1 may be increased from 50 V to 70 V, and the driving voltage applied to the seventh individual electrode X3, which is located opposite the fifth individual electrode X1 with respect to the interface 30, may be reduced from 50 V to 30 V. The driving voltage applied to each of the sixth and eighth individual electrodes X2 and X4 may be maintained at 50 V. In this case, the curvature of the interface 30 (refer to FIG. 5) may change, and accordingly the position at which an image that has passed through the interface 30B is formed may be moved to the left.

Here, the eight individual driving voltages transmitted to the eight individual electrodes L1, L2, L3, L4, X1, X2, X3 and X4 of the liquid lens 28 may have five different levels, and the highest individual driving voltage and the lowest individual driving voltage may be applied in opposite directions with respect to the interface 30. Individual driving voltages having the same level may be symmetrically applied to the individual electrodes that are located on both sides of the individual electrodes to which the highest individual driving voltage and the lowest individual driving voltage are applied.

Referring to FIG. 15b, when it is desired to move the interface 30A (more specifically, the position at which an image that has passed through the interface 30A is formed) positioned at the center of the liquid lens in a diagonal direction, individual supply voltages may be applied to the eight individual electrodes L1, L2, L3, L4, X1, X2, X3 and X4 included in the liquid lens 28.

For example, in order to realize the interface 30C (refer to FIG. 14) moved in a diagonal direction, it is necessary to adjust individual driving voltages applied to the eight individual electrodes L1, L2, L3, L4, X1, X2, X3 and X4. For example, the individual driving voltage applied to each of the first and third individual electrodes L1 and L3 may be maintained at 50 V, whereas the individual driving voltages applied to the second and fourth individual electrodes L2 and L4 may be respectively adjusted to 30 V and 70 V. Further, the individual driving voltage applied to each of the fifth and sixth individual electrodes X1 and X2 may be reduced from 50 V to 40 V, and the individual driving voltage applied to each of the seventh and eighth individual electrodes X3 and X4 may be increased from 50 V to 60 V.

Referring to FIGS. 14 and 15, when an individual driving voltage is applied to one of the subgroups included in the liquid lens, the interface may be moved not only in the leftward, rightward, upward, or downward direction but also in a diagonal direction. More specifically, when it is desired to move the interface in the leftward, rightward, upward, or downward direction, the control circuit or the driving circuit may generate individual driving voltages having two different levels (e.g. 40 V and 60 V, as shown in FIG. 8). When it is desired to move the interface in a diagonal direction, the control circuit or the driving circuit may generate individual driving voltages having three different levels (e.g. 30 V, 50 V, and 70 V, as shown in FIG. 9).

As described above, the interface 30 of the liquid lens 28 may be changed depending on a change in the levels of the individual driving voltages generated by the control circuit or the driving circuit. Specifically, eight individual driving voltages applied to the eight individual electrodes L1, L2, L3, L4, X1, X2, X3 and X4 may be the same, or may have two, three, or five different levels. Further, symmetrical application of the individual driving voltages to the eight individual electrodes L1, L2, L3, L4, X1, X2, X3 and X4 with respect to the interface 30 may contribute to stable maintenance of the curvature of the interface 30.

Meanwhile, depending on the embodiment, a circuit or a logic for changing the above-described individual driving voltages or determining an electrode to which the individual driving voltage is to be applied may be included in the connection part connecting the control circuit or the driving circuit to the individual electrode of the liquid lens.

An optical device (or an optical instrument) including the camera module described above may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

The method according to the embodiment described above may be programmed to be executed in a computer and may be stored on a computer-readable recording medium. Examples of the computer-readable recording medium include ROM, RAM, CD-ROMs, magnetic tapes, floppy disks, and optical data storage devices.

The computer-readable recording medium may also be distributed over network-coupled computer systems so that the computer-readable code is stored and executed in a distributed fashion. Also, functional programs, code, and code segments for accomplishing the above-described method may be easily construed by programmers skilled in the art to which the embodiment pertains.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and the essential characteristics of the disclosure set forth herein. Accordingly, the above detailed description is not intended to be construed as limiting the disclosure in all aspects and to be considered by way of example. The scope of the disclosure should be determined by reasonable interpretation of the accompanying claims, and all equivalent modifications made without departing from the disclosure should be included in the scope of the disclosure.

The invention claimed is:

1. A camera module, comprising:
   a holder comprising a solid lens;
   a liquid lens coupled to the holder;
   a first substrate connected to the liquid lens, the first substrate comprising a first terminal and a second terminal;
   a second substrate connected to the first substrate; and
   an image sensor disposed on the second substrate, the image sensor being located at a position corresponding to the liquid lens,
   wherein the liquid lens comprises:
   a first plate comprising a cavity in which a conductive liquid and a non-conductive liquid are disposed;
   a first electrode disposed on the first plate;
   a second electrode disposed under the first plate, the second electrode comprising a plurality of electrode sectors;
   a second plate disposed on the first electrode; and
   a third plate disposed under the second electrode,
   wherein the first substrate connects the electrode sectors of the second electrode to the second substrate,
   wherein the first terminal is provided in a plural number and is connected to the second substrate, and the second terminal is provided in a plural number and is connected to the electrode sectors of the second electrode, and
   wherein a number of the electrode sectors of the second electrode is greater than a number of the first terminals.

2. The camera module according to claim 1, wherein the first electrode comprises one electrode sector, the second electrode comprises eight or more electrode sectors, and the first substrate comprises four terminals connected to the second substrate.

3. The camera module according to claim 2, wherein the eight or more electrode sectors of the second electrode comprise:
   a first group comprising four electrodes supplying driving voltages in four directions perpendicular to each other; and
   a second group comprising four electrodes, one of the four electrodes being disposed between every two of the four electrodes of the first group.

4. The camera module according to claim 3, wherein a driving voltage applied to each of the electrode sectors of the second group has a level equal to an average level of driving voltages applied to two of the electrode sectors of the first group, which are adjacent to each of the electrode sectors of the second group.

5. The camera module according to claim 2, wherein the eight or more electrode sectors are divided into a plurality of subgroups, each of the subgroups comprising four electrodes,
   wherein a driving voltage is divided into four driving voltages, and is applied only to one of the subgroups.

6. The camera module according to claim 1, comprising an additional voltage generating circuit configured to generate an additional voltage using a voltage input from the first terminal and to output the additional voltage to the second terminal.

7. An optical device, comprising:
   a housing;
   at least one camera module disposed in the housing; and
   a display unit disposed in the housing, the display unit being configured to output an image,
   wherein the camera module comprises:
   a lens assembly comprising a liquid lens, comprising a first electrode comprising at least one electrode sector to control an interface formed by two different kinds of liquid and a second electrode comprising eight or more electrode sectors, and one or more solid lenses;
   a control circuit controlling voltages supplied to the first electrode and to the second electrode; and
   a connection unit connecting individual electrodes and a common electrode to the control circuit.

8. A camera module, comprising:
   a holder comprising at least one solid lens;
   a liquid lens coupled to the holder, the liquid lens having a rectangular shape;
   a first substrate connected to the liquid lens, the first substrate comprising a first terminal and a second terminal;
   a second substrate connected to the first substrate; and
   an image sensor disposed on the second substrate in an optical-axis direction of the liquid lens,
   wherein the liquid lens comprises:
   a first plate comprising a cavity formed therein to accommodate a conductive liquid and a non-conductive liquid therein;
   a first electrode disposed on the first plate;
   a second electrode disposed under the first plate, the second electrode comprising four electrode sectors disposed at corners of the liquid lens, and four electrode sectors, one of which is disposed between every two of the four electrode sectors disposed at the corners;
   a second plate disposed on the first electrode; and
   a third plate disposed under the second electrode,
   wherein the first substrate connects the second electrode to the second substrate.

9. The camera module according to claim 8, wherein the first substrate comprises eight terminals connected to the second substrate, and
   wherein driving voltages supplied to eight electrode sectors of the second electrode have at least three different levels.

10. The camera module according to claim 8, wherein, among driving voltages applied to eight electrode sectors of the second electrode, a highest driving voltage and a lowest driving voltage are symmetrically applied with respect to an interface.

11. The camera module according to claim 6, wherein the additional voltage generating circuit generates the additional voltage having a level equal to half the sum of two voltages which are input from the first terminal.

12. The camera module according to claim 7, wherein the eight or more electrode sectors are divided into a plurality of subgroups, each of the subgroups comprising four electrode sectors, and
   wherein a driving voltage is divided into four driving voltages, and is applied only to one of the subgroups.

13. The camera module according to claim 12, wherein the control circuit determines which subgroup to apply the driving voltages, among the subgroups.

14. The camera module according to claim 12, wherein any subgroup to apply the driving voltages among the subgroups is determined in response to the levels of the driving voltages.

15. The camera module according to claim 12, wherein the plurality of the subgroups includes a first group and a second group adjacent to each other, and
wherein a level of the voltage applied to each of the second electrode sectors belonging to the second group is generated based on voltages applied to first electrode sectors belonging to the first group and being located on both sides of the corresponding second electrode sector.

16. The camera module according to claim 12, wherein the connection unit comprises a plurality of transmission parts, each of the transmission parts receiving driving voltages to be applied to a plurality of first electrode sectors, respectively, and transmitting the received driving voltage to one of the first and second electrode sectors,
wherein the first electrode sectors belong to a first group which is one of the subgroups; and
wherein the second electrode sectors belong to a second group which is another of the subgroups.

17. The camera module according to claim 16, wherein the connection unit comprises determination circuit determining which subgroup to apply the driving voltages among the subgroups.

18. The camera module according to claim 17, wherein the connection unit comprises an adder circuit outputting a driving voltage having a level obtained by summing levels of the driving voltages, respectively, applied to the first electrode sectors and dividing the summing thereof in half, to the second electrode sector.

19. The camera module according to claim 18, wherein the connection unit comprises a switch circuit disposed between the adder circuit and one of the driving voltages, respectively, applied to the first electrode sectors, respectively, the switch circuit being switched in response to a control signal, and
wherein the control signal is provided from the determination circuit or from an outside.

20. The camera module according to claim 10, wherein driving voltages having a same level are applied to a pair of electrode sectors disposed symmetrically to each other at both sides with reference to an electrode sector to which the highest driving voltage is applied and an electrode sector to which the lowest driving voltage is applied.

* * * * *